(12) United States Patent
Kotter

(10) Patent No.: US 8,901,507 B2
(45) Date of Patent: Dec. 2, 2014

(54) RADIATION SENSITIVE DEVICES AND SYSTEMS FOR DETECTION OF RADIOACTIVE MATERIALS AND RELATED METHODS

(71) Applicant: Battelle Energy Alliance, LLC, Idaho Falls, ID (US)

(72) Inventor: Dale K. Kotter, Shelley, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 105 days.

(21) Appl. No.: 13/771,905

(22) Filed: Feb. 20, 2013

(65) Prior Publication Data

US 2014/0246600 A1  Sep. 4, 2014

(51) Int. Cl.
| | | |
|---|---|---|
| *G01T 3/00* | (2006.01) | |
| *G01T 1/185* | (2006.01) | |
| *G01T 3/08* | (2006.01) | |
| *G01J 5/00* | (2006.01) | |
| *G01T 1/26* | (2006.01) | |
| *G01V 5/00* | (2006.01) | |
| *G01T 1/16* | (2006.01) | |

(52) U.S. Cl.
CPC ... *G01T 3/00* (2013.01); *G01T 1/26* (2013.01); *G01V 5/0091* (2013.01); *G01T 1/16* (2013.01)
USPC ............. 250/390.01; 250/370.05; 250/389; 250/338.1

(58) Field of Classification Search
CPC ............................ G01T 1/26; G01V 5/0091
USPC ................... 250/389, 370.05, 390.01
See application file for complete search history.

(56) References Cited

U.S. PATENT DOCUMENTS

| | | | |
|---|---|---|---|
| 2,498,461 A | 2/1950 | Skellett | |
| 4,533,829 A | 8/1985 | Miceli et al. | |
| 6,617,963 B1 * | 9/2003 | Watters et al. | 340/10.41 |

(Continued)

FOREIGN PATENT DOCUMENTS

| | | |
|---|---|---|
| WO | 2007070541 AS | 4/2009 |
| WO | 2012153210 A2 | 11/2012 |

OTHER PUBLICATIONS

Kotter et al., "Lithographic Antennas for Enhancement of Solar-Cell Efficiency," Idaho National Engineering Laboratory, INEEL/EXT-98-00389, Apr. 1998, 26 pages.

Remski et al., "Frequency Selective Surfaces," Design and Analysis Using the Ansoft Product Suite, Ansoft Corporation, Presentation #4, 34 pages, 2000.

(Continued)

*Primary Examiner* — Casey Bryant
*Assistant Examiner* — Jeremy S Valentiner
(74) *Attorney, Agent, or Firm* — TraskBritt

(57) ABSTRACT

Radiation sensitive devices include a substrate comprising a radiation sensitive material and a plurality of resonance elements coupled to the substrate. Each resonance element is configured to resonate responsive to non-ionizing incident radiation. Systems for detecting radiation from a special nuclear material include a radiation sensitive device and a sensor located remotely from the radiation sensitive device and configured to measure an output signal from the radiation sensitive device. In such systems, the radiation sensitive device includes a radiation sensitive material and a plurality of resonance elements positioned on the radiation sensitive material. Methods for detecting a presence of a special nuclear material include positioning a radiation sensitive device in a location where special nuclear materials are to be detected and remotely interrogating the radiation sensitive device with a sensor.

24 Claims, 2 Drawing Sheets

(56) References Cited

U.S. PATENT DOCUMENTS

| | | | |
|---|---|---|---|
| 7,652,572 | B2 | 1/2010 | Roybal et al. |
| 7,792,644 | B2 | 9/2010 | Kotter et al. |
| 8,071,931 | B2 | 12/2011 | Novack et al. |
| 2006/0210279 | A1 | 9/2006 | Hillis et al. |
| 2009/0125254 | A1 | 5/2009 | Kotter et al. |
| 2009/0272906 | A1* | 11/2009 | Gratton .................. 250/370.05 |
| 2010/0067844 | A1 | 3/2010 | Sanders |
| 2010/0284086 | A1* | 11/2010 | Novack et al. ............... 359/580 |
| 2012/0153168 | A1* | 6/2012 | Langeveld .................. 250/366 |
| 2012/0224167 | A1 | 9/2012 | Sanders et al. |
| 2012/0305773 | A1* | 12/2012 | Wu et al. ................ 250/339.07 |

OTHER PUBLICATIONS

U.S. Appl. No. 13/426,407, filed Mar. 21, 2012, titled "Apparatuses and Method for Converting Electromagnetic Radiation to Direct Current," to Kotter et al.

U.S. Appl. No. 13/601,592, filed Aug. 31, 2012, titled "Energy Harvesting Devices, Systems, and Related Methods," to Dale K. Kotter.

U.S. Appl. No. 60/987,630, filed Nov. 13, 2007, titled "Antenna Devices Comprising Flexible Substrates, Related Structures, and Methods of Making and Using the Same," to Pinhero et al.

international Search Report for International Application No. PCT/US2013/077554, dated Sep. 2. 2014, 2 pages.

Written Opinion for International Application No. PCT/US2013/077554, dated Sep. 2, 2014, 5 pages.

* cited by examiner

US 8,901,507 B2

RADIATION SENSITIVE DEVICES AND SYSTEMS FOR DETECTION OF RADIOACTIVE MATERIALS AND RELATED METHODS

GOVERNMENT RIGHTS

This invention was made with government support under Contract Number DE-AC07-051D14517 awarded by the United States Department of Energy. The government has certain rights in the invention.

TECHNICAL FIELD

Embodiments of the present disclosure relate to radiation sensitive devices and systems and methods for detection of radioactive materials using such devices and systems. In particular, embodiments of the present disclosure relate to radiation sensitive devices and systems including a radiation sensitive material and resonance elements associated with the radiation sensitive material.

BACKGROUND

There is a security interest in detecting radioactive materials, such as special nuclear materials ("SNMs," such as, for example, uranium ($^{235}$U, $^{233}$U) and plutonium ($^{239}$Pu)), at airports, seaports, border crossings, public places, and other locations. Conventionally, radiation detectors for identifying SNMs are effective only in close proximity to the SNMs because radiation intensity drops at a rate proportional to $1/r^2$, where r is the distance between the SNM and the radiation detector. SNMs may emit gamma rays and neutrons. Detection of SNMs is conventionally accomplished by detecting characteristic gamma rays, which may be substantially attenuated by shield materials. Neutrons from the SNMs (e.g., so-called "fast" neutrons) are difficult to detect with conventional detectors and are often not distinguished from background neutron emission (e.g., so-called "thermal" neutrons). Radiation detection methods are primarily reliant on ionization and scintillation processes, which often require high voltage biasing and/or electro-optical assemblies that complicate field deployment. Inorganic scintillators, for example, exhibit a nonlinear response and poor energy resolution, which limits their use for high resolution spectroscopic applications. Some conventional radiation detectors require the growth of crystals that are expensive and fragile. Furthermore, many conventional neutron detectors do not have the capability to provide imaging or directional information.

Turning to another technology, frequency selective surfaces (FSS) are used in a wide variety of applications including radomes, dichroic surfaces, circuit analog absorbers, and meanderline polarizers. An FSS is a two-dimensional periodic array of electromagnetic antenna elements. Such antenna elements may be in the form of, for example, conductive dipoles, loops, patches, slots or other antenna elements. FSS structures generally include a metallic grid of antenna elements formed on a dielectric substrate. Each of the antenna elements within the grid defines a receiving unit cell.

An electromagnetic wave incident on the FSS structure will pass through, be reflected by, or be absorbed by the FSS structure. This behavior of the FSS structure generally depends on the electromagnetic characteristics of the antenna elements, which can act as resonance elements. As a result, the FSS structure can be configured to function as low-pass, high-pass, or dichroic filters. Thus, the antenna elements may be designed with different geometries and different materials to generate different spectral responses.

The inventor has appreciated the need for improving upon existing technologies and to provide methods, structures, and systems associated with detecting radiation, such as radiation from radioactive materials (e.g., SNMs).

DETAILED DESCRIPTION

Figure 1:
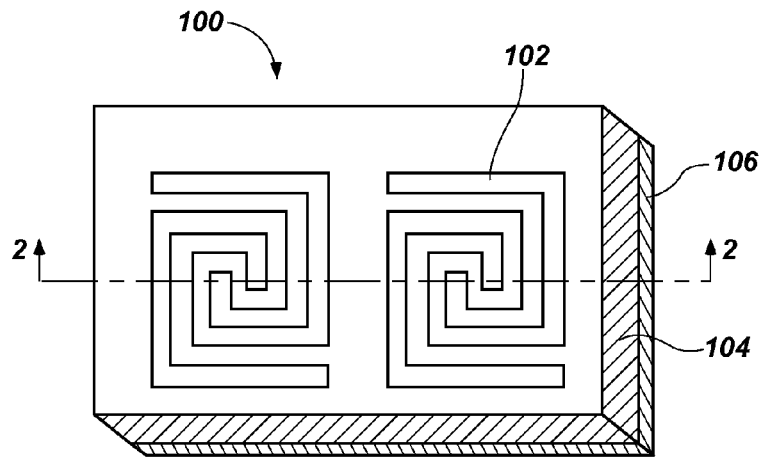
FIG. 1 is a partial perspective view of a radiation sensitive device according to an embodiment of the present disclosure.

In the following detailed description, reference is made to the accompanying drawings which form a part hereof, and in which is shown by way of illustration specific embodiments of the present disclosure. These embodiments are described with specific details to clearly describe the embodiments of the present disclosure. However, the description and the specific examples, while indicating examples of embodiments of the present disclosure, are given by way of illustration only and not by way of limitation. Other embodiments may be utilized and changes may be made without departing from the scope of the disclosure. Various substitutions, modifications, additions, rearrangements, or combinations thereof may be made and will become apparent to those of ordinary skill in the art. In addition, features from one embodiment may be combined with features of another embodiment while still being encompassed within the scope of the disclosure as contemplated by the inventor.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

As used herein, the term "radiation" refers to one or more of energetic particles (e.g., alpha particles, beta particles, neutrons) and energetic waves (e.g., gamma rays, infrared (IR) light, other light, etc.).

As used herein, the phrase "ionizing radiation" means radiation that alters at least one electro-optical property of (e.g., at least partially ionizes) a radiation sensitive material, and may include, for example, energetic alpha particles, beta particles, gamma rays, and neutrons.

As used herein, the phrase "non-ionizing radiation" means radiation that does not alter an electro-optical property of a radiation sensitive material, and may include, for example, visible light, IR light, radio waves, etc.

As used herein, the term "substantially" means to a degree that one skilled in the art would understand the given parameter, property, or condition is met with a small degree of variance, such as within acceptable manufacturing tolerances.

Embodiments of the present disclosure include methods, devices, and systems for detection and/or identification of radioactive materials, such as SNMs.

Radiation sensitive devices of the present disclosure may include an array or other periodic arrangement of resonance elements, which also may be referred to as antennas, microantennas, nanoantennas, and nanoparticles. The radiation sensitive devices may include, but are not limited to, FSS structures. Generally, the radiation sensitive devices may include conductive resonance elements formed in a specific pattern and coupled to a substrate. At least some of the substrate of the present disclosure may include a radiation sensitive material. The resonant properties of the radiation sensitive devices are largely dependent on the structure's layout in terms of shape, dimensions, periodicity, the structure's material properties, and electro-optical parameters of surrounding media. Thus, the resonance elements of the radiation sensitive devices may have a peak resonance that changes based on a change in the radiation sensitive material responsive to incident radiation from a radioactive material, such as an SNM. By varying the device geometry, material properties, or combinations thereof, it is possible to tune the resonance of an FSS structure to meet specific design requirements. The radiation sensitive devices may be used to detect and identify SNMs through the modulation of properties thereof, such as resonance and reflectance, based on exposure to ionizing incident radiation from the SNMs.

Figure 2:
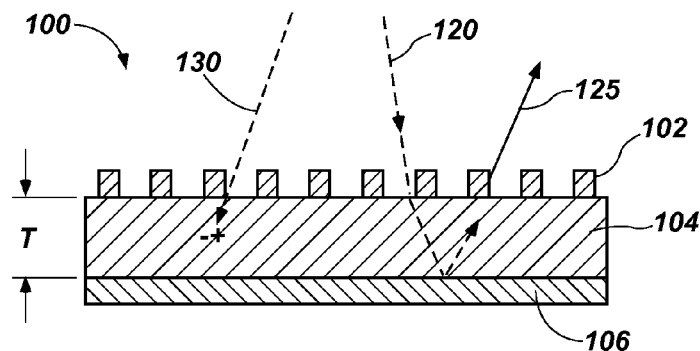
FIG. 2 is a partial cross-sectional view taken along line 2-2 of FIG. 1 showing the radiation sensitive device of FIG. 1.

FIG. 1 is a partial perspective view of a radiation sensitive device 100 according to an embodiment of the present disclosure. FIG. 2 is a partial cross-sectional view taken along line 2-2 of FIG. 1 showing the radiation sensitive device 100 of FIG. 1. The radiation sensitive device 100 may include an array of resonance elements 102 (e.g., nanoantennas, nanoparticles) coupled to (e.g., positioned on or at least partially in) a substrate 104. The substrate 104 may be coupled to (e.g., overlay, be laminated to, be bonded to) a ground plane 106.

The resonance elements 102 may be formed of an electrically conductive material. The conductive material of the resonance elements 102 may include, for example, one or more of manganese (Mn), gold (Au), silver (Ag), copper (Cu), aluminum (Al), platinum (Pt), nickel (Ni), iron (Fe), lead (Pb), and tin (Sn), or any other suitable electrically conductive material. In one embodiment, the conductivity of the material used to form the resonance elements 102 may be from approximately $1.0 \times 10^6$ Ohms$^{-1}$-cm$^{-1}$ to approximately $106.0 \times 10^6$ Ohms$^{-1}$-cm$^{-1}$. As shown in FIGS. 1 and 2, the resonance elements 102 may be disposed on a top surface of the substrate 104 (when viewed in the perspective of FIG. 2, for example). In other embodiments, the resonance elements 102 may be partially or fully disposed within the substrate 104.

In the embodiment described with reference to FIG. 1, the resonance elements 102 are shown as square spirals. However, the geometries (e.g., shape, size, and layout) of the resonance elements 102 may be modified according to the particular application, and the example embodiments described herein are not limiting with respect to such potential geometries. Thus, the geometries of the resonance elements 102 may be tailored (e.g., tuned) to absorb non-ionizing incident radiation 120 (FIG. 2) in a range of wavelengths and resonate at a particular wavelength responsive to the absorbed non-ionizing incident radiation 120. For example, the shape of each resonance element 102 may be a simple dipole, a bowtie dipole, a spiral, a square loop, a circular loop, concentric loops, an ellipse, a rectangle, a triangle, a cross, or any other shape designed to absorb non-ionizing incident radiation 120 and resonate responsive thereto at a given wavelength. The resonance wavelength of the resonance elements 102 may be tailored (e.g., tuned) by altering the geometries and materials of the resonance elements 102 and other components of the radiation sensitive device 100. In response to the resonant elements 102 absorbing the non-ionizing incident radiation 120 and resonating, the resonant elements 102 may generate an output signal 125 having a frequency that is approximately the resonant frequency of the resonance elements 102.

Methods used to analyze and design the components of the radiation sensitive device 100 include modeling techniques known in the art, such as, by way of example, a Periodic Method of Moments (PMM) analysis and/or a finite element analysis (FEA). A PMM analysis may take into consideration a number of different variables, such as anticipated operational wavelengths, material properties, component geometries, and component dimensions, as is known in the art. For example, generally, the resonant frequency or frequencies of the resonance elements 102 may be determined in part by the size, shape, spacing, and material properties of the resonance elements 102, as well as by the configuration and properties of surrounding materials, such as of the substrate 104 and the ground plane 106.

In some embodiments, the resonance elements 102 may be physically and electrically isolated from each other. Therefore, each individual resonance element 102 may have no wiring or other direct electrical connection to adjacent resonance elements 102 or to other electrical devices. Furthermore, each resonance element 102 may lack a diode, as is found in at least some conventional antenna elements. Thus, the array of resonance elements 102 may be configured to operate (e.g., resonate) responsive to absorbed non-ionizing incident radiation 120 independently of a direct electronic signal.

The resonance elements 102 may be formed by known methods of fabrication that are not described in the present disclosure in detail. By way of non-limiting examples, the resonance elements 102 may be formed by at least one of sputtering, electroplating, chemical vapor deposition (CVD), imprint lithography, photolithography, or any other appropriate technique chosen by one of ordinary skill in the art for forming a conductive material on a substrate.

The ground plane 106 may be formed of an electrically conductive material and may serve as a reflective surface for reflecting non-ionizing incident radiation 120. For example, a metal or combination of metals such as manganese (Mn), gold (Au), silver (Ag), copper (Cu), aluminum (Al), platinum (Pt), nickel (Ni), iron (Fe), lead (Pb), tin (Sn), or any other suitably conductive material. In one embodiment, the conductivity of the material used to form the ground plane 106 may be from about $40.0 \times 10^6$ Ohms$^{-1}$-cm$^{-1}$ to about $106.0 \times 10^6$ Ohms$^{-1}$-cm$^{-1}$. The ground plane 106 may also exhibit surface properties that make the ground plane 106 a good optical reflector, with minimal diffusion and scattering of the non-ionizing incident radiation 120. For example, the ground plane 106 may exhibit a reflectivity of approximately 95% or greater over a full spectrum of non-ionizing incident radiation 120 that is expected during operation of the radiation sensitive device 100. Although the ground plane 106 is referred to as a plane, it is to be understood that, in some embodiments, the ground plane 106 may be curved or otherwise non-planar, such as when the radiation sensitive device 100 is to be installed on a curved surface.

As shown in FIG. 2, the substrate 104 of the radiation sensitive device 100 may have a thickness T between a top surface thereof and the ground plane 106 that defines an optical resonance cavity. The substrate 104 may be formed to have a thickness T of about one-quarter (¼) of a wavelength of the anticipated non-ionizing incident radiation 120 for proper phasing of the non-ionizing incident radiation 120 in the optical resonance cavity. For example, a particular embodiment of the radiation sensitive device 100 may include resonance elements 102 configured to resonate responsive to a non-ionizing incident radiation 120 having a wavelength in the range of about 8 μm to about 12 μm. In such an embodiment, the substrate 104 may have a thickness T in the range of about 2 μm to about 3 μm.

The non-ionizing incident radiation 120 to which the radiation sensitive device 100 is exposed may be provided by a radiation source. The radiation source may be a so-called "passive" radiation source or a so-called "active" radiation source. Passive radiation sources generally include radiation sources that exist in the environment. For example, the sun may be a passive radiation source that provides non-ionizing incident radiation 120 to the radiation sensitive device 100. By way of another example, a heated object (e.g., the Earth) may produce thermal non-ionizing incident radiation 120. Active radiation sources include radiation sources that are actively provided for the purpose of inducing resonance of the resonance elements 102 of the radiation sensitive device 100. For example, a laser (e.g., an IR laser), a light emitting diode (LED) (e.g., an IR LED), or a radar may be used as the active radiation source from which non-ionizing incident radiation 120 may be directed toward the radiation sensitive device 100 to induce resonance in the resonance elements 102 thereof. The resonance elements 102 of the radiation sensitive device 100 may be configured to produce the output signal 125 (e.g., resonate) in response to radiation from one or both of an active and a passive radiation source.

At least a portion of the substrate 104 may include a radiation sensitive material. Ionization may be induced in at least a portion of the radiation sensitive material responsive to ionizing incident radiation 130, as shown in FIG. 2, such as radiation from an SNM. The radiation sensitive material of the substrate 104 may include one or more of a dielectric material, a semiconductor material, an organic material, an organic semiconductor material, a scintillator material (e.g., a lanthanum halide material), a liquid crystal material, and a polycrystalline material. In some embodiments, at least a portion of the substrate 104 may include a radiation sensitive dielectric material, such as a radiation sensitive polymer comprising an organic material that is high in hydrogen content. Organic materials high in hydrogen content readily absorb fast neutrons and are ionized thereby. In some embodiments, the substrate 104 may include conjugated polymers that have molecular orbits analogous to energy bands in crystalline semiconductors. The substrate 104 may include polyester, polyamide, poly(methyl methacrylate) (PMMA), polyethylene, and/or another polymer. The substrate 104 may be formed of a bulk material doped with one or more elements that are ionized in the presence of ionizing incident radiation 130, such as boron (B) or gadolinium (Gd). In some embodiments, at least a portion of the substrate 104 may include a semiconductor material. For example, the substrate 104 may include one or more of an elemental semiconductor material (e.g., silicon, germanium, antimony, etc.), a binary compound semiconductor material (e.g., SiGe, SiC, InSb, InAs, GaBs, AlSb, GaN, GaAs, CdTe, etc.), and a ternary compound semiconductor material (e.g., HgCdTe, InGaAs, CdZnTe, HgBrI, etc.).

The substrate 104 formed of one or more of these materials may be sensitive to neutron particle bombardment, gamma rays, or other ionizing incident radiation 130 because the radiation sensitive material thereof may at least partially become ionized responsive to exposure to the ionizing incident radiation 130. In other words, the radiation sensitive material may exhibit characteristics such that the radiation sensitive material at least partially ionizes when exposed to the ionizing incident radiation 130. Ionization of the radiation sensitive material may, at least temporarily, alter the electrooptical properties of the substrate 104. For example, in an embodiment including silicon in the substrate 104, incident radiation may displace silicon atoms from their lattice sites, which modifies the electronic characteristics of the substrate 104. Energy absorbed by electronic ionization in insulating layers, predominantly silicon dioxide, may liberate charge carriers, which diffuse or drift to other locations where they are trapped, leading to localized concentrations of charge and, as a consequence, parasitic fields. The creation of electron-hole pairs may change the bulk electronic properties of the substrate 104 and in turn affect behavior (e.g., resonance, bandwidth, etc.) of the resonance elements 102. Behavior of the resonance elements 102 is influenced by electrical properties of media proximate to the resonance elements 102, such as of the substrate 104. In particular, resonance and bandwidth of the resonance elements 102 may partially be a function of electrical impedance of the substrate 104. Properties of the substrate 104 may be tailored through doping and/or material selection to control performance of the resonance elements 102. Furthermore, properties of the substrate 104 induced through ionization of the radiation sensitive material may affect the behavior of the resonance elements 102. For example, an extinction coefficient (k) and/or an index of refraction (n) of the substrate 104 may change when the substrate 104 is exposed to the ionizing incident radiation 130. A permittivity of the substrate 104 and/or an emissivity of the radiation sensitive device 100 may also change responsive to the ionizing incident radiation 130. Secondary properties (e.g., peak resonance, reflectivity, etc.) of the radiation sensitive device 100 may also change based on the change in the extinction coefficient, index of refraction, permittivity, and/or emissivity. Such changes may be detected and measured to determine whether the radiation sensitive device 100 is or has been exposed to ionizing incident radiation 130 from an SNM, as will be explained in more detail below.

The radiation sensitive material of the substrate 104 may be selected such that the substrate 104 ionizes responsive to particular wavelengths, types, and/or energies of ionizing incident radiation 130. So-called "fast neutrons" that are emitted by SNMs may exhibit a kinetic energy of greater than about 1 eV (e.g., about 1 MeV) and a wavelength of less than about 30 pm. On the other hand, so-called "thermal neutrons" that may exist in the environment (i.e., "background" neutrons) may exhibit a kinetic energy of about 0.025 eV and a wavelength of about 180 pm. The radiation sensitive device 100 may be configured to detect fast neutrons by selecting a radiation sensitive material that ionizes when exposed to neutrons having the energy and wavelength in the fast range, rather than in the thermal range. In other words, the radiation sensitive material selected may ionize when exposed to fast neutrons but not ionize (or ionize less) when exposed to thermal or background neutrons, such as organic materials high in hydrogen (e.g., polyethylene, borated plastic, plastic scintillator materials, etc.). Therefore, when the radiation sensitive device 100 is exposed to ionizing radiation 130 from the environment (e.g., thermal neutrons from granite tile), the substrate 104 may not ionize and the radiation sensitive device 100 may operate (e.g., resonate) at a baseline state. However, when the radiation sensitive device 100 is exposed to ionizing radiation 130 from an SNM, the substrate 104 may at least partially ionize. Such ionization may change the permittivity of the substrate 104 and may, as a result, change the emissivity of the radiation sensitive device 100 and/or the peak resonating wavelength of the resonance elements 102. For example, the frequency of the output signal 125 produced by the resonance elements 102 may be modulated responsive to the ionizing radiation 130 interacting with the substrate 104 and changing the characteristics of the substrate 104. Thus, such a change in the characteristics of the substrate 104 may be detected by methods known in the art, such as, for example, reflectance radiometry or thermal camera profiling, of the output signal 125.

As will be explained in more detail below, in some embodiments the resonance of the resonance elements 102 may be interrogated remotely, such as through detection of the output signal 125 from a relatively long distance (e.g., more than about 5 km). As used herein, the term "interrogate" means to detect at least one property or signal, such as a property of the radiation sensitive device 100 or radiation (e.g., the output signal 125) emanating from the radiation sensitive device 100 through resonance of the resonance elements 102 thereof. Some wavelengths of electromagnetic radiation transmit through the atmosphere more readily than others. Therefore, the resonance elements 102 may be configured to have a peak electromagnetic resonance wavelength in a range that transmits the output signal 125 relatively well through the atmosphere. For example, such peak electromagnetic resonance wavelengths may be between about 8 μm and about 14 μm, which correspond generally to the long-IR spectrum. In a particular embodiment, the resonance elements 102 may be configured to have a peak resonance wavelength between about 10 μm and about 12 μm.

By way of example, a thermal camera (e.g., a forward looking infrared (FUR) camera) may be used to detect radiation produced by the resonance of the resonance elements 102 of the radiation sensitive device 100. The change in permittivity and/or emissivity of the substrate 104 responsive to ionization from exposure to the ionizing incident radiation 130 may induce a change in the resonance of the resonance elements 102. In other words, the output signal 125 may be modulated when the substrate 104 interacts with the ionizing incident radiation 130. Such a change may depend on the particular SNM that provides the ionizing incident radiation 130. For example, a first SNM (e.g., $^{235}$U) may radiate neutrons at a first energy level and wavelength, while a second, different SNM (e.g., $^{239}$Pu) may radiate neutrons at a second, different energy level and wavelength. Thus, each SNM may produce a different ionizing incident radiation 130, and the peak resonance of the radiation sensitive device 100 may be modulated depending on the type (e.g., isotope) of SNM in the vicinity of the radiation sensitive device 100 that provides the ionizing incident radiation 130. The peak resonance can be measured with the thermal camera and compared to predicted or measured values. If there is a change in the peak resonance from a baseline or control value, then it can be inferred that an SNM is in the vicinity of the radiation sensitive device 100. The amount of change in peak resonance from the baseline value may be different for various SNM isotopes. Thus, each SNM isotope may have a spectral "fingerprint" that can be measured to identify the SNM isotope. Therefore, the presence and type (e.g., isotope) of the SNM in the vicinity of the radiation sensitive device 100 may be identified.

Figure 3:
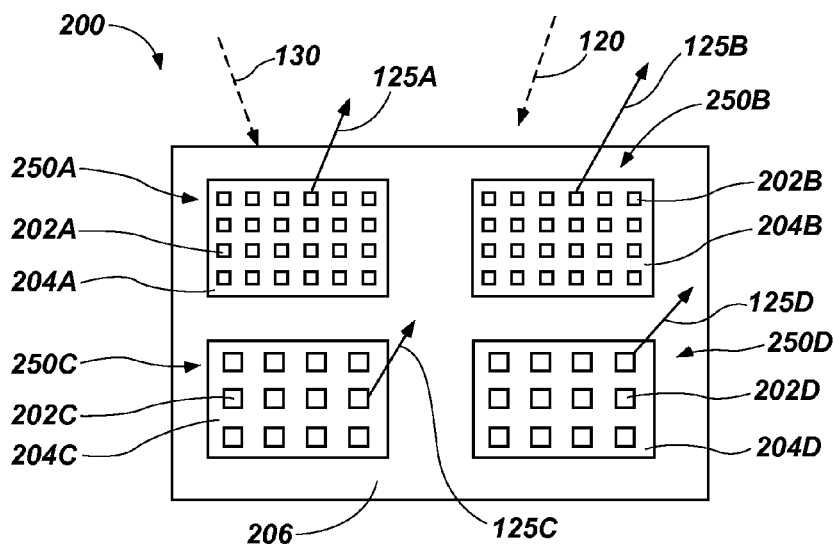
FIG. 3 is a partial plan view of a radiation sensitive device according to another embodiment of the present disclosure.

FIG. 3 is a partial plan view of another embodiment of a radiation sensitive device 200 according to the present disclosure. The radiation sensitive device 200 may include a ground plane 206 and a plurality of arrays 250A, 250B, 250C, and 250D of resonance elements 202A, 202B, 202C, and 202D, respectively. Each array 250A, 250B, 250C, and 250D may include a substrate 204A, 204B, 204C, or 204D, respectively, formed over the ground plane 206. Each of the arrays 250A, 250B, 250C, and 250D may be the same as or different from the other arrays 250A, 250B, 250C, and 250D in one or more of material composition, layout, resonance element geometry, and radiation sensitivity. Each array 250A, 250B, 250C, and 250D of the radiation sensitive device 200 may have characteristics such that the respective resonance elements 202A, 202B, 202C, and 202D thereof resonate or change in resonance responsive to a particular range of non-ionizing incident radiation 120 and ionizing incident radiation 130. Thus, the different regions of the radiation sensitive device 200 may each be tailored (e.g., tuned) to respond to various types of non-ionizing incident radiation 120 and/or to various types of ionizing incident radiation 130.

By way of example and not limitation, the first array 250A may include the first resonance elements 202A having a first material composition and geometry. For example, the first resonance elements 202A may have a square spiral shape of a first size and be formed from a first conductive material. The first resonance elements 202A may be formed on or at least partially in the first substrate 204A having a first thickness and a first substrate composition. For example, the composition of the first substrate 204A may include a conventional dielectric material that is not a radiation sensitive material, as is known in the art. Thus, the first array 250A may be configured as a baseline (e.g., control, reference) array that operates (e.g., resonates) independent of exposure to ionizing incident radiation 130.

The second array 250B may include the second resonance elements 202B that have a second material composition and geometry that is substantially identical to that of the first resonance elements 202A. However, the second substrate 204B of the second array 250B may include a radiation sensitive material, as described above with reference to FIGS. 1 and 2. Therefore, the first and second arrays 250A and 250B may have the same or substantially similar peak resonance in the presence of non-ionizing radiation 120 when ionizing incident radiation 130 is absent. However, when the radiation sensitive device 200 is exposed to ionizing incident radiation 130, the radiation sensitive material of the second substrate 204B may become at least partially ionized and a permittivity thereof may change. This change in permittivity may induce a change in the peak resonance of the second resonance elements 202B. However, because the first substrate 204A is not sensitive to the ionizing incident radiation 130, the first resonance elements 202A may continue to resonate at the baseline peak resonance. The difference between the resonance of the first array 250A (i.e., the baseline array) and the second array 250B may be detected and analyzed to indicate the presence of an SNM or other source of ionizing incident radiation 130 to which the second array 250B is sensitive. Additionally, the particular SNM that produced the ionizing incident radiation 130 and, consequently, the change in the resonance of the second array 250B, may be identified by comparing the signal's change with predicted or measured responses to known SNMs.

As shown in FIG. 3, the radiation sensitive device 200 may, optionally, include a third array 250C and a fourth array 250D. The third array 250C may include third resonance elements 202C and a third substrate 204C. The third resonance elements 202C may have a third material composition and geometry. By way of example and not limitation, the third geometry may be different than the first and second geometries of the respective first and second resonance elements 202A, 202B described above. For example, the third resonance elements 202C may have a different shape and/or size that resonates at a substantially different peak resonance than the first and second resonance elements 202A, 202B when exposed to the non-ionizing radiation 120. The third substrate 204C may include a radiation sensitive material that is substantially similar to the radiation sensitive material of the second substrate 204B. Thus, the only substantial difference between the second array 250B and the third array 250C may be in the shape and/or size of the resonance elements 202B, 202C in each array. For example, the second resonance elements 202B may be configured to resonate responsive to non-ionizing incident radiation 120 from an active radiation source, such as an IR laser, while the third resonance elements 202C may be configured to resonate responsive to non-ionizing incident radiation 120 from a passive radiation source, such as the sun. Thus, the radiation sensitive device 200 may function with a variety of sources of non-ionizing incident radiation 120, which improves the versatility of the radiation sensitive device 200.

The fourth array 250D may include the fourth resonance elements 202D, which may be substantially similar to the third resonance elements 202C in material composition, layout, shape, and/or size. However, the fourth substrate 204D may include a radiation sensitive material that is different from the second and third substrates 204B, 204C. For example, the radiation sensitive material of the fourth array 250D may be selected to be sensitive to (e.g., to ionize responsive to) ionizing incident radiation 130 having a different energy and/or wavelength. The fourth array 250D may exhibit a change in resonance that is tailored to a specific range of wavelengths and energies of ionizing incident radiation 130.

Accordingly, the radiation sensitive device 200 may include a plurality of arrays 250A, 250B, 250C, and 250D that each have a specific radiation sensitivity and peak resonance, among other properties. As a result, a plurality of different output signals 125A, 125B, 125C, and 125D may be generated by each respective array 250A, 250B, 250C, and 250D. The radiation sensitive device 200 may exhibit predictable and measurable responses to the presence of different SNMs that expose the radiation sensitive device 200 to the ionizing incident radiation 130. Each of the arrays 250A, 250B, 250C, and 250D may be designed to respond to ionizing incident radiation 130 from a different SNM, such that the presence and identity of a particular SNM may be determined simply by determining which of the arrays 250A, 250B, 250C, and 250D, if any, has substantially changed in resonance from a baseline value.

Although the embodiment of the radiation sensitive device 200 shown in FIG. 3 has been described with reference to the arrays 250A, 250B, 250C, and 250D having a particular configuration and material properties, the present disclosure is not so limited. One of ordinary skill in the art will recognize that a particular radiation sensitive device may have any number of arrays of resonance elements and corresponding substrates in any combination appropriate for a particular application. Furthermore, the present disclosure encompasses radiation sensitive devices having a single array of resonance elements and a corresponding substrate. Thus, the configuration and material properties of radiation sensitive devices according to the present disclosure may be tailored to tune the detection abilities, sensitivities, layouts, etc., of the radiation sensitive devices for a given application.

Figure 4:
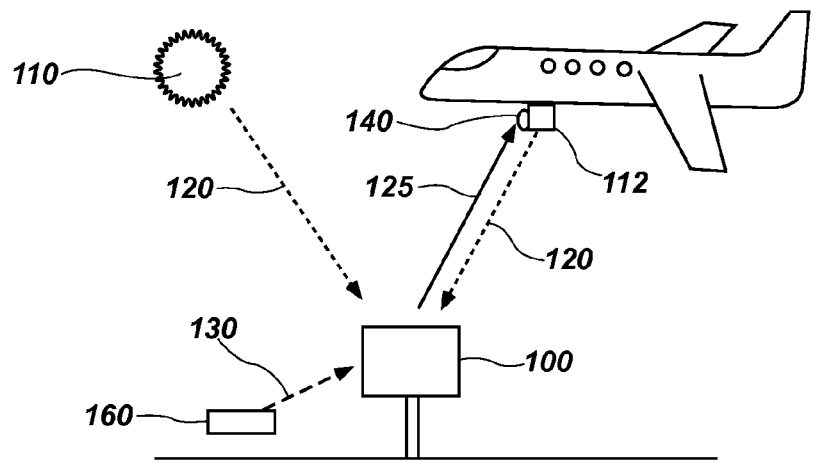
FIG. 4 is a simplified view of a method of detecting a special nuclear material using a radiation sensitive device according to an embodiment of the present disclosure.

FIG. 4 is a simplified view showing an embodiment of a method of detecting an SNM 160 using a radiation sensitive device 100 according to the present disclosure. Although the embodiment of FIG. 4 is described with reference to the radiation sensitive device 100 of FIGS. 1 and 2, it is to be understood that the radiation sensitive device 200 of FIG. 3 or any other radiation sensitive device or system falling within the scope of the present disclosure may be used with the method shown in FIG. 4.

The radiation sensitive device 100 may be positioned in a location where SNMs 160 are to be detected, such as at a border crossing, an airport, a seaport, a public place, etc. The radiation sensitive device 100 may be located on a wall, a billboard, a vehicle, or any other surface at the desired location. Non-ionizing incident radiation 120 may contact the radiation sensitive device 100 and induce resonance of at least some of the resonance elements 102 (FIGS. 1 and 2) thereof. The non-ionizing incident radiation 120 may be provided by a passive radiation source 110, such as the sun. Alternatively or in addition, the non-ionizing radiation 120 may be provided by an active radiation source 112, such as an IR laser. The resonance elements 102 (FIGS. 1 and 2) of the radiation sensitive device 100 may absorb at least some of the non-ionizing incident radiation 120 and electromagnetically resonate responsive thereto. Such resonance may cause the resonant elements 102 to generate the output signal 125 in the form of emitted electromagnetic radiation at the designed peak resonance wavelength of the radiation sensitive device 100.

The output signal 125 may be detected by a sensor 140, which may be located a distance from the radiation sensitive device 100. In other words, the radiation sensitive device 100 may be interrogated by the sensor 140. The sensor 140 may be relatively proximate to or distant from the radiation sensitive device 100. The distance between the sensor 140 and the radiation sensitive device 100 may be only limited by the distance that the output signal 125 can be detected. Conventional radiation detectors require sensors that are close enough to an SNM where ionizing radiation 130 (e.g., gamma rays, fast neutrons) produced by the SNM are not absorbed or otherwise attenuated by the atmosphere or a shielding material. However, the radiation sensitive device 100 of the present disclosure enables the sensor 140 to be located more remotely, so long as the radiation sensitive device 100 is proximate the SNM and the sensor 140 has a line of sight with the radiation sensitive device 100 at the wavelength of the output signal 125. Thus, the present disclosure enables the installment of the relatively simple, small, and/or less expensive radiation sensitive device 100 in locations of interest for SNM detection, while the more complex, bulky, and/or expensive sensors 140 can be located remotely. For example, the sensor 140 may be located on an airplane (FIG. 4), on a satellite, on a ground vehicle, mounted to a wall, etc. According to one embodiment, the radiation sensitive device 100 of the present disclosure enables identification of SNMs through interrogation of the radiation sensitive device 100 with the sensor 140 located more than about 5 km away.

Furthermore, multiple radiation sensitive devices 100 may be installed in various locations of interest (i.e., along a border) without any locally associated infrastructure such as wiring, signal processing equipment, or active sensors. A single sensor 140 located remotely may be able to interrogate the multiple radiation sensitive devices 100 simultaneously or serially to determine which, if any, indicates the presence of an SNM proximate thereto. Thus, the costs of installing a complex communication and/or signal processing system may be avoided or reduced by using the radiation sensitive devices 100 of the present disclosure. Of course, it will be apparent to one of ordinary skill in the art that the sensor(s) 140, signal processing systems, and/or communication systems may, additionally or alternatively, be located proximate to the radiation sensitive device 100, as deemed appropriate given a particular application or location of the radiation sensitive device 100. However, the radiation sensitive device 100 of the present disclosure may have the ability to indicate the presence of SNMs to the sensor 140 at a significantly greater distance than is possible with conventional SNM detectors.

The sensor 140 may be capable of sensing the output signal 125 produced by the resonance of the radiation sensitive device 100. For example, if the radiation sensitive device 100 is configured to produce the output signal 125 in the IR band of light, the sensor 140 may be a conventional FLIR camera, a thermal camera, a radiometer, etc., that is configured to sense IR wavelengths. The sensor 140 may optionally be coupled to the active radiation source 112, such as an IR laser, an IR light emitting diode (LED), etc., to induce resonance in the radiation sensitive device 100 and to provide a baseline signal that can be compared to the output signal 125 produced by the radiation sensitive device 100. Alternatively, the active radiation source 112 may not be coupled to the sensor 140. For example, the active radiation source 112 may be located proximate to the radiation sensitive device 100 to provide non-ionizing incident radiation 120 locally, while the sensor 140 receives and detects the output signal 125 induced by the non-ionizing incident radiation 120 remotely. The output signal 125 may be analyzed by the sensor 140, or by a computer system (not shown) operatively connected to the sensor 140, to determine the peak resonance of the radiation sensitive device 100 at the time of interrogation. Optionally, the sensor 140 or the computer system may be capable of known data acquisition and processing methods, and may include a filter that removes noise and background signals to more clearly detect and analyze the output signal 125 and/or the change thereof. Based on the peak resonance sensed by the sensor 140, the presence or lack of an SNM 160 in the vicinity of the radiation sensitive device 100 may be determined.

In some embodiments, the presence and/or identity of an SNM 160 in the vicinity of the radiation sensitive device 100 may be determined by measuring a response of the radiation sensitive device 100 other than the resonance of the resonance elements 102. For example, reflectance radiometry may be used to measure the reflectance of the radiation sensitive device 100. The active radiation source 112 may direct a non-ionizing incident radiation 120 having controlled properties (e.g., wavelength, intensity, polarity, etc.) toward the radiation sensitive device 100 as a reference signal. The non-ionizing incident radiation 120 may be reflected off of the surface of the radiation sensitive device 100 in the form of the output signal 125. In this sense, the non-ionizing incident radiation 120 provided by the active radiation source 112 may be referred to as a reference signal 120. The output signal 125 may be detected by the sensor 140 and compared to the reference signal 120. In this manner, the reflectance of the radiation sensitive device 100 may be measured. The radiation sensitive device 100 may have a known baseline reflectance, determined by modeling or measurement in the absence of ionizing incident radiation 130. However, when the substrate 104 including the radiation sensitive material is at least partially ionized by the ionizing incident radiation 130, the reflectance of the radiation sensitive device 100 may change. Such a modulation in the reflectance of the radiation sensitive device 100 may be measured by the sensor 140. As described above, the radiation sensitive device 100 may exhibit a known response to the presence of various SNMs to enable detection and identification of the SNM 160 in the vicinity of the radiation sensitive device 100.

Furthermore, a system is disclosed for detecting a presence of an SNM, which may include the radiation sensitive device 100, 200 and the sensor 140 for remotely interrogating the radiation sensitive device 100, 200. The radiation sensitive device 100, 200 and the sensor 140 may include substantially the same features and capabilities described above with reference to FIGS. 1 through 4.

Figure 5:
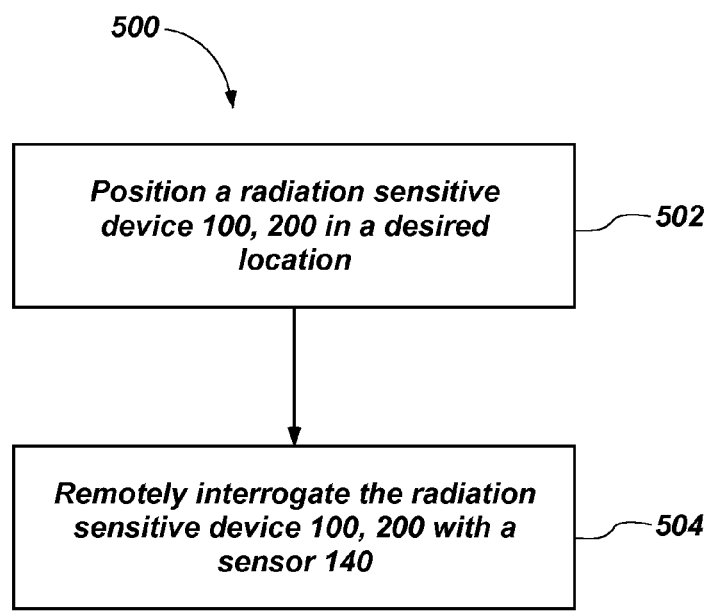
FIG. 5 is a flowchart illustrating a method for detecting a presence of a special nuclear material according to an embodiment of the present disclosure.

FIG. 5 is a flowchart 500 illustrating a method for detecting a presence of an SNM according to an embodiment of the present disclosure. At operation 502, a radiation sensitive device 100, 200 may be positioned in a desired location, such as a location where a presence of an SNM is to be detected. Any of the radiation sensitive devices 100, 200 described above with reference to FIGS. 1 through 4 or their equivalents may be used with the method. At operation 504, the radiation sensitive device 100, 200 may be remotely interrogated with the sensor 140, as described in more detail above. For example, at least one of resonance and reflectance of the radiation sensitive device 100, 200 may be detected with the sensor 140. In some embodiments, the sensor 140 may interrogate the radiation sensitive device 100, 200 from at least about 5 km away from the radiation sensitive device 100, 200. In some embodiments, the radiation sensitive device 100, 200 may be exposed to non-ionizing radiation 120. Such non-ionizing radiation 120 may induce resonance in at least some resonance elements 102, 202A, 202B, 202C, 202D of the radiation sensitive device 100, 200. The non-ionizing radiation 120 may be provided by the active radiation source 112 or by the passive radiation source 110 (FIG. 4). The method may also include exposing the radiation sensitive device 100, 200 to ionizing radiation 130 from an SNM 160 (FIG. 4), which may at least partially ionize the radiation sensitive material to change at least one peak resonance of the resonance elements 102, 202A, 202B, 202C, 202D. A change of the at least one peak resonance may be measured with the sensor 140, as described in more detail above.

Embodiments of the present disclosure, such as those described above, may include devices or systems that are amenable to installation and use in a variety of locations and for a variety of applications. Furthermore, the radiation sensitive devices may be of any size chosen by one of ordinary skill in the art given a particular application.

CONCLUSION

An embodiment of the present disclosure includes a radiation sensitive device that includes a substrate comprising a radiation sensitive material, and a plurality of resonance elements comprising a conductive material in the substrate. The radiation sensitive material exhibits characteristics such that the radiation sensitive material at least partially ionizes when exposed to ionizing incident radiation. Each resonance element of the plurality of resonance elements is configured to resonate responsive to non-ionizing incident radiation to produce an output signal. At least one characteristic of the output signal changes responsive to the radiation sensitive material at least partially ionizing when exposed to ionizing incident radiation.

Another embodiment of the present disclosure includes a system for detecting radiation from a special nuclear material. The system includes a radiation sensitive device and a sensor located remotely from the radiation sensitive device and configured to measure an output signal produced by the radiation sensitive device. The radiation sensitive device includes a radiation sensitive material and a plurality of resonance elements comprising a conductive material positioned on the radiation sensitive material.

Yet another embodiment of the present disclosure includes a method for detecting a presence of a special nuclear material. The method includes positioning a radiation sensitive device in a location where special nuclear materials are to be detected and remotely interrogating the radiation sensitive device with a sensor to determine whether the radiation sensitive device is exposed to ionizing radiation from a special nuclear material. The radiation sensitive device that is positioned in the desired location includes a substrate comprising a radiation sensitive material that at least partially ionizes when exposed to ionizing radiation from a special nuclear material. The radiation sensitive device also includes a plurality of resonance elements coupled to the radiation sensitive material, the plurality of resonance elements exhibiting at least one peak resonance that is modulated responsive to the radiation sensitive material at least partially ionizing. The method may further include exposing the radiation sensitive device to non-ionizing radiation to induce resonance in at least some of the resonance elements of the radiation sensitive device.

While the present disclosure is susceptible to various modifications and alternative forms, specific embodiments have been shown by way of example in the drawings and have been described in detail herein. However, the invention is not intended to be limited to the particular forms disclosed. Rather, the invention covers all modifications, combinations, equivalents, and alternatives falling within the scope of the following appended claims and their legal equivalents.

What is claimed is:

1. A radiation sensitive device, comprising:
a substrate comprising a radiation sensitive material exhibiting characteristics such that the radiation sensitive material at least partially ionizes when exposed to ionizing incident radiation; and
a plurality of resonance elements comprising a conductive material coupled to the substrate, wherein each resonance element of the plurality of resonance elements is configured to resonate responsive to non-ionizing incident radiation to produce an output signal, wherein at least one characteristic of the output signal changes responsive to the radiation sensitive material at least partially ionizing when exposed to ionizing incident radiation.

2. The radiation sensitive device of claim 1, wherein each resonance element of the plurality of resonance elements has a shape selected from the group consisting of a simple dipole, a bowtie dipole, a spiral, a square loop, a square spiral, a circular loop, concentric loops, an ellipse, a rectangle, a triangle, and a cross.

3. The radiation sensitive device of claim 1, further comprising a ground plane comprising a conductive material, wherein the substrate is coupled to at least a portion of the ground plane.

4. The radiation sensitive device of claim 1, wherein the radiation sensitive material exhibits characteristics such that it at least partially ionizes when exposed to ionizing incident radiation from a special nuclear material.

5. The radiation sensitive device of claim 1, wherein a peak resonance of the plurality of resonance elements changes responsive to the radiation sensitive material at least partially ionizing when exposed to ionizing incident radiation.

6. The radiation sensitive device of claim 1, wherein the substrate has a thickness that is about one-fourth a wavelength of the non-ionizing incident radiation to which each resonance element of the plurality of resonance elements is configured to resonate.

7. The radiation sensitive device of claim 1, wherein at least some resonance elements of the plurality of resonance elements are configured to resonate in the infrared spectrum of light.

8. The radiation sensitive device of claim 1, further comprising:
another substrate over another portion of the ground plane; and
another plurality of resonance elements comprising a conductive material coupled to the another substrate.

9. The radiation sensitive device of claim 8, wherein the another substrate comprises a material that does not ionize when exposed to ionizing incident radiation.

10. The radiation sensitive device of claim 1, wherein the radiation sensitive material comprises at least one of a polymer and a semiconductor material.

11. A system for detecting radiation from a special nuclear material, the system comprising:
a radiation sensitive device, comprising:
a radiation sensitive material, a thickness thereof defining an optical resonance cavity; and
a plurality of resonance elements comprising a conductive material positioned on the radiation sensitive material; and
a sensor located remotely from the radiation sensitive device and configured to measure an output signal produced by the radiation sensitive device.

12. The system of claim 11, wherein the radiation sensitive device further comprises an optically reflective ground plane coupled to the radiation sensitive material on a side thereof opposite the plurality of resonance elements.

13. The system of claim 11, wherein the sensor comprises an infrared camera configured to detect an output signal produced by resonance of the plurality of resonance elements in the infrared light spectrum.

14. The system of claim 11, wherein the radiation sensitive device comprises a plurality of arrays of the resonance elements, at least one array of the plurality of arrays configured to exhibit a known spectral response to ionizing incident radiation from a special nuclear material.

15. The system of claim 14, wherein each array of the plurality of arrays differs from other arrays of the plurality of arrays in at least one of material composition, layout, resonance element geometry, and radiation sensitivity.

16. The system of claim 11, wherein the radiation sensitive device is configured to have a peak resonance wavelength in the range between about 8 μm and about 14 μm.

17. The system of claim 11, further comprising an active radiation source configured to provide non-ionizing radiation to induce resonance in the plurality of resonance elements.

18. A method for detecting a presence of a special nuclear material, the method comprising:
positioning a radiation sensitive device in a location where special nuclear materials are to be detected, the radiation sensitive device including a substrate comprising a radiation sensitive material that at least partially ionizes when exposed to ionizing radiation from a special nuclear material and a plurality of resonance elements coupled to the radiation sensitive material, the plurality of resonance elements exhibiting at least one peak resonance that is modulated responsive to the radiation sensitive material at least partially ionizing; and remotely interrogating the radiation sensitive device with a sensor to determine whether the radiation sensitive device is exposed to ionizing radiation from a special nuclear material.

19. The method of claim 18, further comprising exposing the radiation sensitive device to non-ionizing radiation to induce resonance in at least some resonance elements of the plurality of resonance elements.

20. The method of claim 19, wherein exposing the radiation sensitive device to non-ionizing radiation comprises exposing the radiation sensitive device to non-ionizing radiation from a passive radiation source.

21. The method of claim 19, wherein exposing the radiation sensitive device to non-ionizing radiation comprises exposing the radiation sensitive device to radiation from at least one of the sun and a heated object.

22. The method of claim 18, wherein remotely interrogating the radiation sensitive device with a sensor comprises detecting at least one of resonance and reflectance of the radiation sensitive device with the sensor.

23. The method of claim 18, wherein remotely interrogating the radiation sensitive device with a sensor comprises detecting at least one of resonance and reflectance of the radiation sensitive device with a sensor located at least about 5 km from the radiation sensitive device.

24. The method of claim 18, further comprising:

exposing the radiation sensitive device to ionizing radiation from a special nuclear material to at least partially ionize the radiation sensitive material and to modulate the at least one peak resonance of the resonance elements; and measuring the modulation of the at least one peak resonance of the resonance elements with the sensor.

* * * * *